(12) United States Patent
Alhaideri et al.

(10) Patent No.: US 11,947,198 B2
(45) Date of Patent: Apr. 2, 2024

(54) EYEWEAR CHARGING CASE USING CHARGE PINS AS COMMUNICATION PATH

(71) Applicant: Snap Inc., Santa Monica, CA (US)

(72) Inventors: Miran Alhaideri, Los Angeles, CA (US); Alex Bamberger, Venice, CA (US); Gerald Nilles, Culver City, CA (US); Russell Douglas Patton, Playa Vista, CA (US); Yu Jiang Tham, San Diego, CA (US)

(73) Assignee: Snap Inc., Santa Monica, CA (US)

( * ) Notice: Subject to any disclaimer, the term of this patent is extended or adjusted under 35 U.S.C. 154(b) by 86 days.

(21) Appl. No.: 17/690,265

(22) Filed: Mar. 9, 2022

(65) Prior Publication Data
US 2022/0197062 A1    Jun. 23, 2022

Related U.S. Application Data

(63) Continuation of application No. 16/549,096, filed on Aug. 23, 2019, now Pat. No. 11,333,904.

(60) Provisional application No. 62/725,627, filed on Aug. 31, 2018.

(51) Int. Cl.
```
G02C 7/10      (2006.01)
G02F 1/153     (2006.01)
G02F 1/163     (2006.01)
G02F 1/17      (2019.01)
```
(52) U.S. Cl.
CPC ............. *G02C 7/101* (2013.01); *G02F 1/153* (2013.01); *G02F 1/163* (2013.01); *G02F 1/172* (2013.01); *G02F 2201/58* (2013.01)

(58) Field of Classification Search
CPC ......... G02C 7/101; G02F 1/153; G02F 1/163; G02F 1/172; G02F 2201/58; H02J 7/342; H02J 7/0042; H02J 7/0044; A45C 11/04
USPC ................................. 351/41, 158; 704/270
See application file for complete search history.

(56) References Cited

U.S. PATENT DOCUMENTS

| | | | |
|---|---|---|---|
| 5,455,637 | A | 10/1995 | Kallman et al. |
| 9,482,882 | B1 | 11/2016 | Hanover et al. |
| 11,333,904 | B2 | 5/2022 | Alhaideri et al. |
| 2013/0314303 | A1 | 11/2013 | Osterhout et al. |
| 2017/0269148 | A1 | 9/2017 | Sporck et al. |

OTHER PUBLICATIONS

International Search Report and Written Opinion for International Application No. PCT/US2019/047934, dated Oct. 17, 2019 (Oct. 17, 2019)—12 pages.

*Primary Examiner* — Tuyen Tra
(74) *Attorney, Agent, or Firm* — Culhane Meadows PLLC; Stephen J. Weed (57) ABSTRACT

A case for an eyewear device having a conductive interface includes a housing that receives the eyewear device. A multi-purpose interface, supported by the housing, includes at least one contact arranged to couple with the conductive interface of the eyewear device when the housing receives the eyewear device. Circuitry is coupled to the at least one contact and includes a processor that detects a connection of the conductive interface of the eyewear device to the multi-purpose interface of the case. The processor performs a charging process during a charge state of the case in which an electrical charge is provided at the multi-purpose interface of the case to the eyewear device. Data is exchanged with the eyewear device during a communication state of the case.

17 Claims, 4 Drawing Sheets

EYEWEAR CHARGING CASE USING CHARGE PINS AS COMMUNICATION PATH

CROSS-REFERENCE TO RELATED APPLICATIONS

This application is a Continuation of U.S. application Ser. No. 16/549,096 filed on Aug. 23, 2019 and claims priority to U.S. Provisional Application Ser. No. 62/725,627 filed on Aug. 31, 2018, the contents of which are incorporated fully herein by reference.

TECHNICAL FIELD

The subject matter disclosed herein relates generally to a charging case for an electronic device.

BACKGROUND

Electronic devices typically have integrated electronics requiring an onboard power supply in the form of a battery. A case for the electronic device may also include a power supply for charging the battery of the electronic device when the electronic device is stored in the case. Improvements to charging cases for electronic devices are useful in the interests of enhancing usability and convenience, for example.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details.

The descriptions of the exemplary embodiments that follows are intended to be read in connection with the accompanying drawings, which are to be considered part of the entire written description. In the description, relative terms such as "right," "left," "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both removable or rigid attachments or relationships, unless expressly described otherwise.

The term "coupled" refers to any logical, optical, physical or electrical connection, link or the like by which signals or light produced or supplied by one system element are imparted to another coupled element. Unless described otherwise, coupled elements or devices are not necessarily directly connected to one another, and intermediate components that may modify, manipulate, or carry the light or signals may separate elements or communication media.

Figure 1:
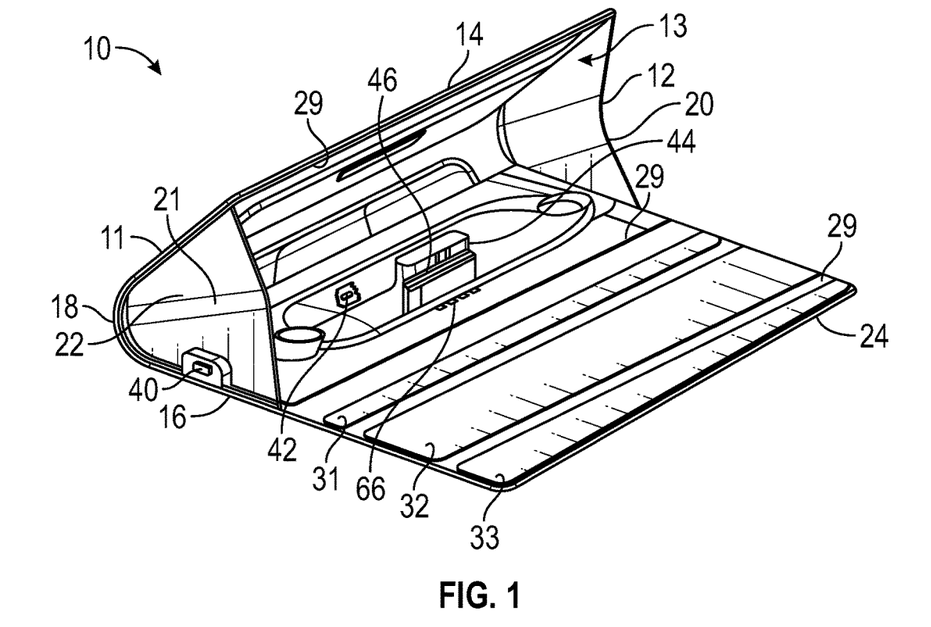
FIG. 1 depicts an isometric view of a case according to one example shown both open and expanded, wherein portions of the case are shown cutaway to reveal internal details.

FIG. 1 depicts an isometric view of an example case for receiving an eyewear device. The eyewear device may be, for example, eyeglasses, spectacles, or headgear. The case 10 is shown in an open and expanded state, wherein portions of the case are shown cutaway to reveal internal details. The case 10 includes a housing 11 having an opening 12 leading to a hollow cavity 13 that is sized and shaped to receive and hold an eyewear device when, for example, the temples of the particular eyewear device are in a folded state. The illustrated housing 11 includes a rectangular shaped front wall 14; a rectangular shaped rear wall 16; a curved bottom wall 18 connecting the front and rear walls; a triangular shaped left wall 20 interconnecting the left-side edges of the walls 14, 16 and 18; a triangular shaped right wall 22 interconnecting the right-side edges of the walls 14, 16 and 18; and a trapezoidal shaped flap 24 (also referred to herein as a cover) that extends from the top edge of the rear wall 16 for covering the opening 12 of the housing 11 in a closed state of the case 10 (not shown).

The front wall 14 and the rear wall 16 each include a plurality of layers. A series of protrusions and recesses are formed on the interior facing surface of the front and rear walls 14 and 16 that are sized and shaped to contact surfaces of the eyewear device (not shown) to limit movement of the eyewear device when stowed within the case 10.

The base layer may include one or more magnets (not shown) on the front wall 14, with a decorative material layer covering them so the magnets are not visible to the end user. The one or more magnets may interact with magnets embedded in the flap 24 for releasably retaining the flap 24 to the front wall 14. As used herein, a magnet is a material or object that produces a magnetic field. A magnet may be either a permanent magnet or a ferromagnetic material. A permanent magnet is an object made from a magnetized material and that creates its own persistent magnetic field.

The curved bottom wall 18, which connects the front and rear walls 14 and 16, includes a plurality of layers including an elastically deformable inner plastic layer that is covered on each side by the same decorative layer 29 as the other walls. The curved bottom wall 18 may be referred to herein as a mechanical spring. The natural state of the bottom wall 18 is a collapsed state. Moving the case 10 from the collapsed state to the expanded state, in order to stow the eyewear device within the cavity 13 of the case 10, causes the bottom wall 18 to elastically deform in an outward direction. When either the eyewear device is removed from the cavity 13 of the case 10 or a force that is manually applied to the case 10 for maintaining the case in the expanded state is removed, the curved bottom wall 18 returns the case 10 to its natural collapsed. In another example, the housing of the case may be a rigid, non-deformable structure.

The left and right walls 20 and 22, respectively, each may have a preformed fold 21 that is capable of being folded inwardly when the case 10 is moved from the expanded state of to the collapsed state. The trapezoidal shaped flap 24 includes articulated and interconnected segments. The flap 24 includes inner facing and outer facing layers. The inner facing and outer facing layers may be composed of a same decorative layer as the other walls. A series of inserts are embedded between the inner facing and outer facing layers of the flap 24. A first insert 31, positioned closest to the rear wall 16, has a rectangular shape with rounded edges and is composed of plastic. A second insert 32, positioned further from the rear wall 16, has a rectangular shape with rounded edges and is composed of a magnet that is sandwiched between two plastic pieces. A width dimension of the second insert 32 is substantially equal to that of the first insert 31; however, a height dimension of the second insert 32 is substantially greater than that of the first insert 31. A third insert 33, which is positioned furthest from the rear wall 16, has a trapezoidal shape with rounded edges and is also composed of a magnet that is sandwiched between two plastic pieces.

The magnets of the second and third inserts 32 and 33 interact with one or more magnets (not shown) that are embedded in the front wall 14 for releasably retaining the flap 24 to the front wall 14 in either a closed and collapsed state or a closed and expanded state of the case 10.

A connector 40, capable of transferring power (and/or signals), is mounted to the right edge of the rear wall 16. In operation, a cable 73 (FIG. 3) is connected to the connector 40 for charging a battery 42 within the case. Circuity within the case 10 interconnects the battery 42 to the connector 40. The connector 40 may be a USB connector, for example, or a connector having radial charge contacts. The connector 40 may be essentially any electrical connector that is capable of transferring power and is not limited to a particular style of connector.

Figure 2:
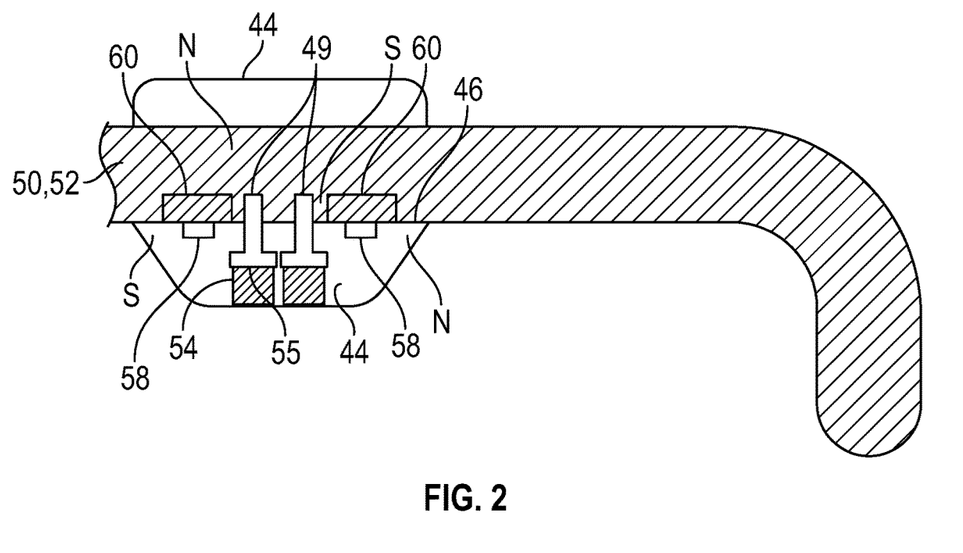
FIG. 2 depicts a schematic view of a conductive interface on an eyewear device in connection with a multi-purpose interface of the case.

As best shown in FIGS. 1 and 2, a multi-purpose interface 44 is positioned on an interior facing side of the rear wall 16. The multi-purpose interface 44 protrudes into the cavity 13 of the case 10. The multi-purpose interface 44 is configured to be releasably connected to a conductive interface on the eyewear device, e.g., conductive interface 49 on the temple 50 of the eyewear device 52 for charging a battery in the eyewear device using the battery of the case 10. The multi-purpose interface 44 includes, for example, a plastic housing fastened to a base layer of the front wall 14 by screws or adhesive, for example. A shoulder 46 that is formed on the multi-purpose interface 44, forms a shelf upon which the temple 50 of the eyewear device 52 can be positioned. At least one contact is arranged to couple with the conductive interface 49. As illustrated in FIG. 2, two electrical contacts 54 are disposed within the multi-purpose interface 44 for interacting with the conductive interface 49 of the eyewear device 52. The electrical contact 54 are electrically connected to the battery 42 of the case 10 for receiving power therefrom and transferring that power to the conductive interface 49 of the eyewear device 52.

In one example, each electrical contact 54 of the case 10 is a pogo-pin style contact that is biased outwardly by an internal spring 55. In an assembled form of the case 10, the spring 55 biases the contact 54 outwardly toward the conductive interface 49 disposed on the temple 50 of the eyewear device 52. The outwardly biasing action of the spring 55 helps to ensure sufficient surface contact between the electrical contacts 54 of the case 10 and the conductive interface 49 of the eyewear device 52 so that electricity can be reliably transferred from the battery 42 of the case 10 to the internal battery (not shown) of the eyewear device 52. Suitable pogo-pin style contacts are distributed by the Mill-Max Corporation of New York, USA.

Magnets 58 of the multi-purpose interface 44 of the case are positioned on either side of the electrical contacts 54. The magnets 58 interact with magnets 60 disposed on the temple 50 of the eyewear device 52. The magnetic force between the magnets 58 and 60 is sufficiently greater than the spring force of the electrical contact 54 to ensure that the temple 50 of the eyewear device 52 remains connected to the connector 44 of the case 10 while the springs 55 bias the temple 50 of the eyewear device 52 away from the case 10. One set of the two sets of magnets 58 and 60 could be a permanent magnet, whereas the other set of the two sets of magnets 58 and 60 could be ferromagnetic.

The adjacent magnets 58 have opposite polarity (as indicated by the North (N) and South (S) designations), and the adjacent magnets 60 also have opposite polarity, to provide an even stronger attraction between the mating magnets.

A display or indicator in the form of a plurality of lights 66 (four shown) are disposed on the interior facing side of the rear wall 16. The lights 66 may be LED lights. The lights 66 illuminate to represent the power remaining in the battery 42 of the case 10. For example, if the battery 42 is fully charged, then all four lights 66 are illuminated. Whereas, if the battery 42 is significantly depleted then one light 66 is illuminated. The lights 66 are illuminated only when the flap 34 is open thereby conserving battery power. It should be understood that the display may vary from that which is shown and described. For example, the display could comprise a single light that is capable of illuminating different colors, e.g., green indicating a full charge and red indicating a low charge or no charge. Various other suitable displays are known to those skilled in the art.

Figure 3:
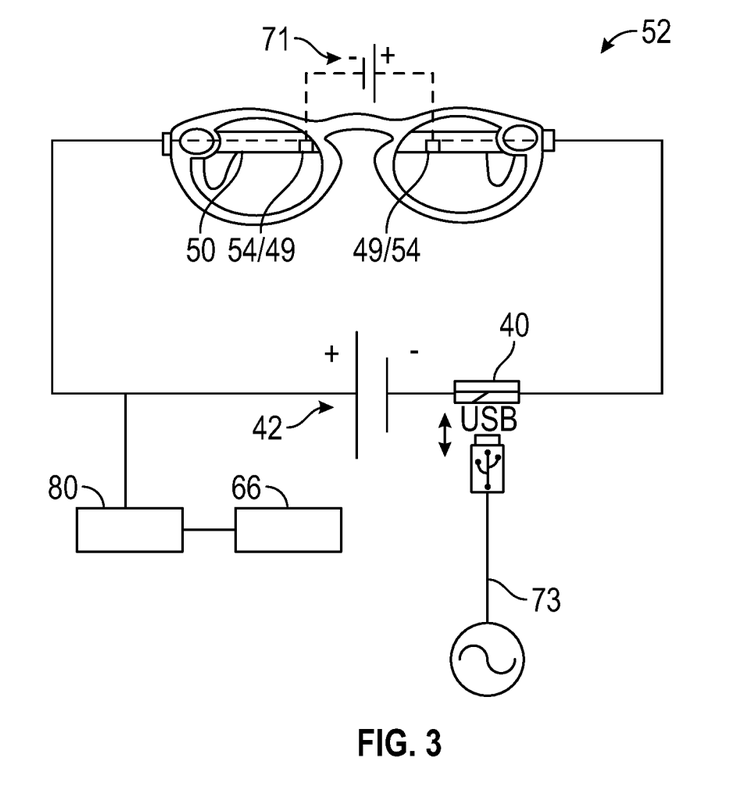
FIG. 3 is a schematic circuit diagram showing charging circuitry that forms a part of the case and a complimentary eyewear device to be charged by the charging circuitry of the case.

FIG. 3 is a schematic circuit diagram showing charging circuitry included in the case 10 and the complimentary eyewear device 52 for charging during a charging state and communication of data during a communication state. In the example illustrate by FIG. 3, the battery 42 of the case 10 is coupled to the conductive interface 49 of the eyewear device 52. The battery 42, charging contact 54, and the conductive paths between them together form an interrupted charging circuit that can be completed by the eyewear device 52 via contact engagement of the respective conductive interface 49 of the eyewear device 52 with the corresponding charging contacts 54 of the case 10.

As shown schematically in FIG. 3 in broken lines, the onboard electronics of the eyewear device 52 includes charging circuitry connecting the conductive interface 49 to the onboard battery 71 of the eyewear device 52. The internal charging circuitry is configured to cause charging of the onboard battery 71 when a voltage difference with the illustrated polarity is applied over the conductive interface 49.

The case battery 42 is connected to the charging connector port 40 incorporated in the case 10. The case 10 thus includes a charging circuit option for the case battery 42, in this example by connection to the mains power via a charging cable 73 removably connectable to the charging port 40. In some examples, the charging circuit of the case 10 is configured such that connection to mains power via the charging port 40 while the eyewear device 52 are connected to the charging circuit (such as in FIG. 3) resulting in charging of the onboard battery of the eyewear device 52 by mains power.

When the eyewear device 52 is located in the case 10 in a charging configuration such that the conductive interface 49 is coupled to the respective charging contacts 54, the onboard battery 71 of the eyewear device 52 is automatically recharged by the battery 42 of the case 10 (or, if the case 10 is connected to mains power by a charging cable 73, the glasses battery 71 is recharged by mains power). A processor 80 is connected to the power circuit and the lights 66. The processor 80 receives the charge state of the case battery 42 through the power circuit.

Figure 4:
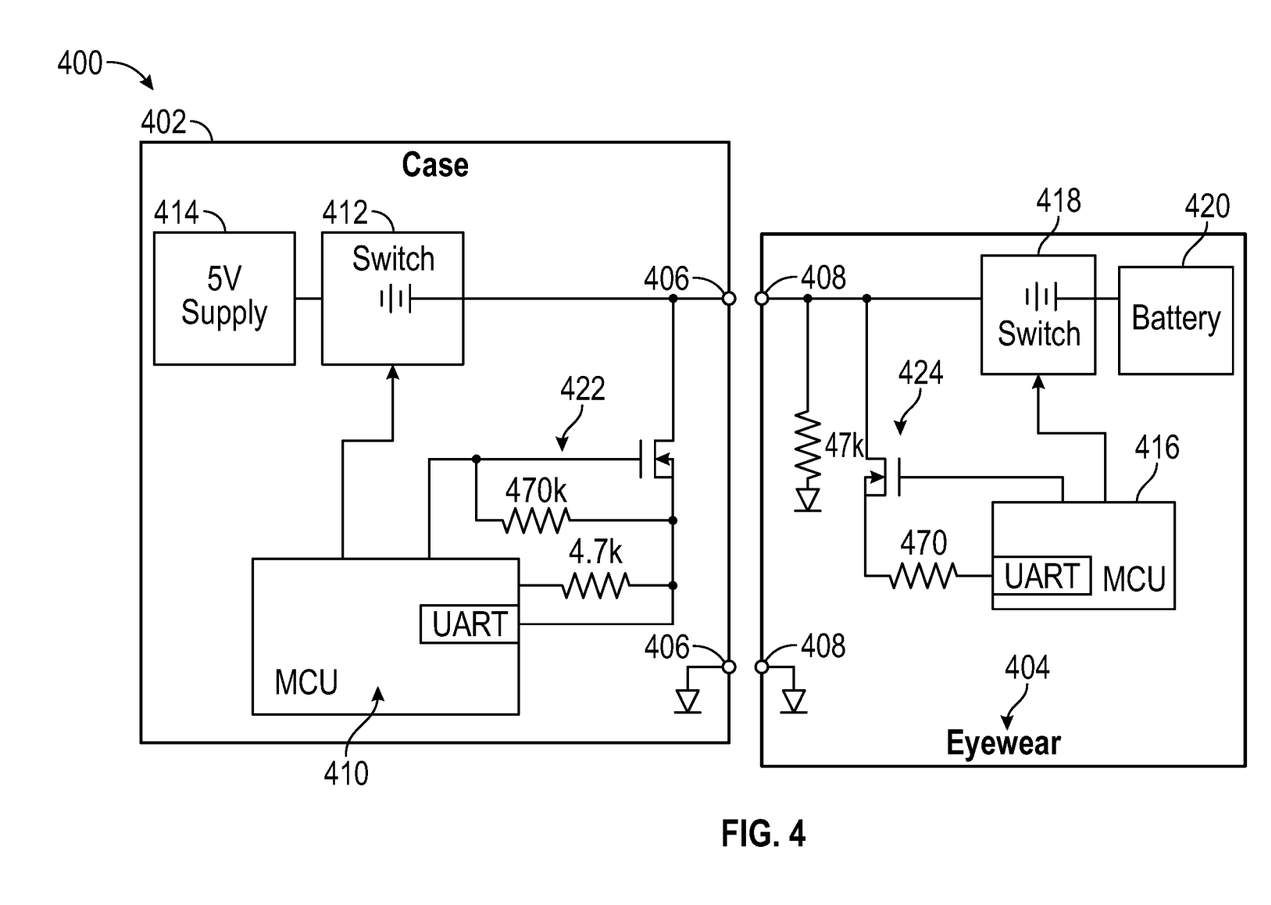
FIG. 4 is a block diagram of example hardware components of the case and eyewear device.

FIG. 4 is a block diagram of an example of the hardware components of the charging case and eyewear device.

The block diagram 400 of FIG. 4 includes a case 402 and eyewear device 404 such as described in FIGS. 1 and 2 above. The hardware components arranged within the housing of the case 402 include, for example, a processor 410 for controlling components in the case 402, circuitry 422 such as, for example, a negative channel field effect transistor (NFET) protection circuit to protect the case 402 from current drain and corrosion when a device is not connected and there are mismatched I/O voltage connections to the case 402.

The housing of the case 402 supports a multi-purpose interface 406. The multi-purpose interface 406 includes at least one contact configured to connect or couple with, for example, the eyewear device 404, via a conductive interface 408 of the eyewear device 404 for charging of the battery 420 of the eyewear device 404 and/or data communication between the case 402 and eyewear device 404. The processor 410 of case 402 and a processor 416 of the eyewear device may each include a communication component using a single-wire communication protocol, for example, a Universal Asynchronous Receiver/Transmitter (UART) configured to transmit and receive data for the exchange of data between the case 402 and the eyewear device 404 over a single wire. Charging case 402 may further include a switching device, controlled by the processor 410, and coupled to the circuitry 422 and a power supply 414. In FIG. 4, an example 5-volt dc power supply is illustrated; however, the power supply 414 is not limited to this value.

The electronic components of the eyewear device 404 include, for example, a processor 416 for controlling components of the eyewear device 404, a battery 420 for powering the components of the eyewear device 404, a switching device 419 coupled to the battery and circuitry such as field effect transistors, for example, an NFET protection circuit to protect the eyewear device from mismatched I/O connections to other devices. Eyewear device 404 further includes a conductive interface 408 that includes charge pads arranged for coupling to the multi-purpose interface 406 of the charging case 402. The at least one contact of the multi-purpose interface of the charging case 402 includes a first contact corresponding to a first charge pad of the conductive interface 408 and a second contact corresponding to a second charge pad of the conductive interface 408 of the eyewear device 404. Although not illustrated in FIG. 4, the eyewear device may further include various components common to mobile electronic devices such as eyewear devices or smartphones, for example, a display controller for controlling display of visual media, a wireless module (e.g., Bluetooth™) for communication between the eyewear device 404 and a mobile device such as a smartphone, tablet device or server, a camera, flash storage for storing data (e.g., images, video, image processing software, etc.), and LEDs which may be configured to provide visual operation feedback to a user of the eyewear device 404.

The processor 410 of the charging case 402 is configured to detect a connection of the conductive interface 408 of the eyewear device 404 to the multi-purpose interface 406. In order to detect the connection of the conductive interface 408 to the multi-purpose interface 406, voltage levels at pins, for example, pogo pins, of the multi-purpose interface 406 and conductive interface 408, are monitored and analyzed by the processor 410. In an example, the voltage levels vary between 0 volts and a drain supply voltage VDD based upon, for example, a connection of the conductive interface 408 of the eyewear device 404 to the multi-purpose interface 406 of the case 402.

As illustrated in FIG. 4, circuitry 422 includes a first pull-up resistor having, for example, a resistance of 470K ohms, and a second pull-up resistor having, for example, a resistance of 4.7K ohms. When the switch 412 is in an open position, a first voltage level at the multi-purpose interface 406 varies based upon a connection state of the pull-up resistors. Table 1 provides examples of the various digital and analog voltage levels VDD at the multi-purpose interface 406 of the case 402 based upon the pull-up resistor values illustrated in FIG. 4. The pull-up resistor values of 470K ohms and 4.7K ohms are provided only as examples. One of ordinary skill in the art will recognize that other resistor values may be used.

TABLE 1

| Case Pull Up | Specs Connected | Short Between Pins | Digital Voltage at Pin [0 or 1] | ADC Reading [V] |
|---|---|---|---|---|
| 470k | No | No | 1.00 | 3.00 |
| 470k | Yes | No | 0.00 | 0.27 |
| 4.7k | No | No | 1.00 | 3.00 |
| 4.7k | Yes | No | 1.00 | 2.73 |
| 470k | Yes | Yes | 0.00 | 0.10 |
| 4.7k | Yes | Yes | 0.00 | 0.10 |

In an example, when the switch 412 is in an open position, and the eyewear device 404 is not connected to the multi-purpose interface 406, a voltage level with the 470K pull-up resistor is 3.0 volts when there is no short between the pins of the multi-purpose interface 406. When the eyewear device 404 is connected at the multi-purpose interface 406 (and there is no short at the pins), a voltage level of the case with pull-up resistor 470K ohm is 0.27 volts. The eyewear device 404 includes a pull-down resistor having a weak pull-down value, for example, 47K ohms. When the eyewear device 404, having the 47 k ohm pull-down resistor, is detected at the multi-purpose interface 406, a voltage level of the case 402 is 2.73 volts. When a voltage level is measured that is less than the first voltage level known for when no eyewear device 404 is connected to the multi-purpose interface 406, for example, less than 3.0 volts, the processor is able to determine whether there is a short between the pins which results in a minimal voltage level, for example, 0-0.10 volts, or the eyewear device 404 is connected to the multi-purpose interface 406, i.e., the process detects the connection of the conductive interface 408 of the eyewear device 404 to the multi-purpose interface 406 of the case 402. As illustrated in Table 1, when the eyewear device 404 is connected to the multi-purpose interface 406 of the case, a voltage level may vary between 0.27 volts-2.73 volts. Upon the detection of the connection of the eyewear device 404, the processor 410 sends a signal to close the switching device 412 and initiates the charging process during a charge state of the case 402. An electrical charge is provided at the multi-purpose interface 406 to charge the battery 420 of the eyewear device 404 during the charge state.

In an another example for detecting and confirming a connection of the conductive interface 408 of the eyewear device 404 to the multi-purpose interface 406, additional pull-up resistors, for example the second resistor in the case 402 illustrated in FIG. 4 having a value of 4.7K ohms, may be used to obtain digital or analog to digital converter (ADC) measurements to determine whether the pull-down from the first voltage level of 3.0-volts is the result of the connection of eyewear device 404 as opposed to an unexpected electrical short, etc. For example, as provided in Table 1, when the switch 412 is in an open position, and the eyewear device 404 is not connected, a voltage level of the case 402 at the 4.7 k pull-up resistor is 3.0 volts. When the eyewear device 404 is connected, a voltage level of the case using the second pull-up resistor, 4.7 k, is 2.73 volts.

Upon completion of the charge state of the case 402, processor 410 may send a signal to open the switch 412 so that charging is discontinued, and initiate a half-duplex communication state, for example, via the UART, in which the case 402 is synchronized with the eyewear device and data is exchanged between eyewear device 404 and the case 402 via the connection of the conductive interface 408 to the multi-purpose interface 406. The data exchanged may include, for example, case usage statistics, battery efficiency statistics, or a charge level of the case 402.

Using time multiplexing, the multi-purpose interface 406 of the case 402 can perform both functions of charging the battery 420 of the eyewear device 404 and exchanging digital communications. During the charge state of the case 402, no communication occurs. At the end of the charge state, using, for example, a single-wire half-duplex communication protocol, for example a UART communication protocol, data may be exchanged between the case 402 and the eyewear device 404. The case 402 may transition periodically between a charging state and a communication state, e.g., under control of the processor 410.

Figure 5:
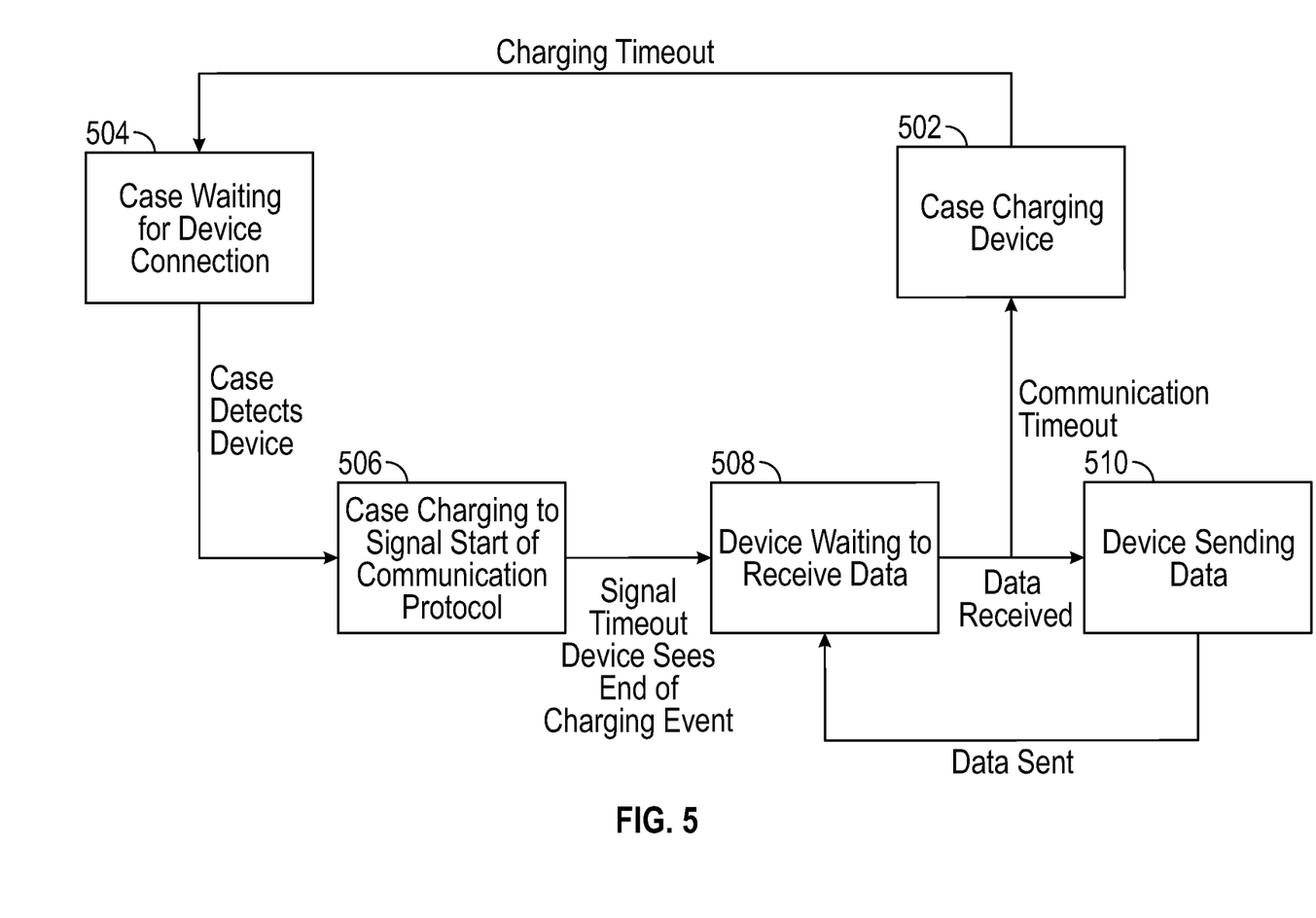
FIG. 5 is a flow diagram illustrating an example use of the case during charging and communication states.

FIG. 5 is a flow diagram illustrating an example of the use of the charging case during charging and communication states.

In the example of FIG. 5, the case 402 at step 502 includes components similarly described above, for example, in FIG. 4. At step 502, the case 402 is idle and the charge state of the case 402 is inactive. At step 504, while the case 402 awaits detection of the connection of, for example, the eyewear device 404, the switch 412 is in an open position such that the power supply 414 is not connected. The connection of the eyewear device 404 to the charging case 402, as described above, includes detecting a connection of the conductive interface 408 to at least one contact of the multi-purpose interface 406 of the charging case 402, where the multi-purpose interface may consist of a first contact corresponding to a first charge pad of the conductive interface and a second contact corresponding to a second charge pad of the conductive interface of the eyewear device. When the processor of the charging device detects the connection of the eyewear device, the process moves to step 506.

At step 506, the processor of the charging case sends a signal to the switch 412 to change the switch to a closed position and initiates a charging process during a charge state of the case. The charge state of the case has an initial charging period having a first fixed time, for example, approximately 500 msec, starting upon the detection of the connection of the contact pads of the conductive interface of the eyewear device to at least one contact of the multi-purpose interface of the charging case, and ending with a first charge interrupt signal. After the first charge interrupt signal, the switching device of the charging case is switched to an open position to disconnect the power supply and end the charging state. The process moves to step 508.

At step 508, the processor of the case initiates a communication state during which data is exchanged between the charging case and the eyewear device, and the connected eyewear device awaits receipt of data from the case. Data is transmitted, for a first predetermined time of the communication state, for example, 10 msec, to the eyewear device using a communication protocol such as the UART protocol of the processor of the charging device. The process moves to step 510.

At step 510, the eyewear device sends data to the charging device for a second predetermined time of the communication state, for example, 10 msec, using a half-duplex communication protocol such as the UART of the processor of the eyewear device. The process returns to step 508.

The exchange of data during the communication state of the case continues during steps 508 and 510, which are repeated for a predetermined duration, for example approximately 50 msec with each data packet (case-to eyewear device or eyewear device to case) being less than approximately 10 msec, that ends the communication state. When the communication state of the case ends, the process returns to step 502. If the eyewear device has a completely charged or desired battery charge level, the battery status of the eyewear device 404 is communicated to the case 402 using the UART protocol, and the conductive interface of the eyewear device may be disconnected from the multi-purpose interface of the charging device. The process then ends with the case 402 entering a low power mode or power off mode.

The eyewear device 404 may be stowed in the case 402. When stowed, the weaker pull-up resistance, for example, the 470 k ohm resistor, of case 402 is activated. During the duration of the eyewear device 404 being positioned or stowed within the case 402, the 47 k ohm pull-down resistance of the eyewear device 404 will dominate to cause the voltage level at the multi-purpose interface 406 of the case 402 to be low relative to the Vdd voltage level of 3.0 volts for the 470 k ohm pull-up resistance when the eyewear device 404 is not connected. The low voltage level measurement at the multi-purpose interface 406 may be, for example, 0.27 volts, as provided in Table 1 when the pull-up resistance is 470 k ohm and the eyewear device 404 is connected. When the eyewear device 404 is removed from the case 402 the voltage level at the multi-purpose interface 406 of the case 402 will float high, for example, 3.0 volts, and the processor 410 can quickly detect that the eyewear device 404 is removed based upon the increased voltage level at the multi-purpose interface 406.

It is to be understood that the steps of the processes described herein are performed by a processor upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the processor described herein is implemented in software code or instructions which are tangibly stored on a tangible computer readable medium. Upon loading and executing such software code or instructions by the processor, the processor may perform any of the functionalities described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Although an overview of the inventive subject matter has been described with reference to specific examples, various modifications and changes may be made to these examples without departing from the broader scope of examples of the present disclosure. For example, although the description focuses on an eyewear device, other electronic devices such as headphones are considered within the scope of the inventive subject matter. Such examples of the inventive subject matter may be referred to herein, individually or collectively, by the term "invention" merely for convenience and without intending to voluntarily limit the scope of this application to any single disclosure or inventive concept if more than one is, in fact, disclosed.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. A case for an eyewear device having a conductive interface, the case comprising:
   a housing configured to receive the eyewear device;
   a connection interface supported by the housing, the connection interface comprising at least one contact arranged to couple with the conductive interface of the eyewear device; and
   circuitry coupled to the at least one contact, the circuitry including a first resistance, a second resistance, and a processor, the processor configured to:
      connect the first resistance to the connection interface;
      detect a first voltage level during the connection of the first resistance;
      connect the second resistance to the connection interface;
      detect a second voltage level during the connection of the second resistance;
      detect connection of the eyewear device responsive to at least one of the detected first and second voltage levels; and
      detect a short at the connection interface responsive to at least one of the detected first and second voltage levels.

2. The case of claim 1, wherein the first resistance is a first pull-up resistance and the second resistance is a second pull-up resistance.

3. The case of claim 1, wherein the processor detects the connection of the eyewear device when at least one of the first voltage level or the second voltage level is below a predefined voltage level.

4. The case of claim 1, wherein the processor is further configured to:
   provide an electrical charge at the connection interface of the case to the eyewear device during a charge state of the case; and
   exchange data with the eyewear device, via the connection interface, during a communication state of the case.

5. The case of claim 4, wherein the processor is configured to provide the electrical charge in response to the detected connection of the eyewear device.

6. The case of claim 1, wherein the processor is configured to detect the connection of the eyewear device to the connection interface in response to detection of a predetermined difference between a pull-up signal at the connection interface of the case and a pull-down signal at the connection interface.

7. A system, comprising:
   an eyewear device including a conductive interface; and
   a case configured to receive the eyewear device, the case comprising:
      a housing configured to receive the eyewear device;
      a connection interface supported by the housing, the connection interface comprising at least one contact arranged to couple with the conductive interface of the eyewear device; and
      circuitry coupled to the at least one contact and including a first resistance, a second resistance, and a processor, the processor configured to:
         connect the first resistance to the connection interface;
         detect a first voltage level during the connection of the first resistance;
         connect the second resistance to the connection interface;
         detect a second voltage level during the connection of the second resistance;
         detect connection of the eyewear device responsive to at least one of the detected first and second voltage levels; and
         detect a short at the connection interface responsive to at least one of the detected first and second voltage levels.

8. The system of claim 7, wherein the first resistance is a first pull-up resistance and the second resistance is a second pull-up resistance.

9. The system of claim 7, wherein the processor detects the connection of the eyewear device when at least one of the first voltage level or the second voltage level is below a predefined voltage level.

10. The system of claim 7, wherein the processor is further configured to:
    provide an electrical charge at the connection interface of the case to the eyewear device during a charge state of the case; and
    exchange data with the eyewear device, via the connection interface, during a communication state of the case.

11. The system of claim 10, wherein the processor is configured to provide the electrical charge in response to the detected connection of the eyewear device.

12. The system of claim 7, wherein the processor is configured to detect the connection of the eyewear device to the connection interface in response to detection of a predetermined difference between a pull-up signal at the connection interface of the case and a pull-down signal at the connection interface.

13. The system of claim 7, wherein the at least one contact of the connection interface comprises a first contact corresponding to a first charge pad of the conductive interface and a second contact corresponding to a second charge pad of the conductive interface.

14. A method comprising:
connecting a first resistance to a connection interface of an eyewear case;
detecting a first voltage level during the connection of the first resistance to the connection interface;
connecting a second resistance to the connection interface of the case;
detecting a second voltage level during the connection of the second resistance;
detecting connection of an eyewear device responsive to at least one of the detected first and second voltage levels;

detecting a short at the connection interface responsive to at least one of the detected first and second voltage levels.

15. The method of claim 14, further comprising:
comparing at least one of the first or second voltage levels to a predefined threshold;
wherein connection of the eyewear device is detected when the at least one of the first or second voltage levels is below the predefined voltage level.

16. The method of claim 14, further comprising:
providing an electrical charge at the connection interface of the case to the eyewear device during a charge state of the case; and
exchanging data with the eyewear device, via the connection interface, during a communication state of the case.

17. The method of claim 16, further comprising:
providing the electrical charge in response to the detected connection of the eyewear device.

* * * * *